United States Patent [19]
Coyne et al.

[11] Patent Number: 5,937,056
[45] Date of Patent: Aug. 10, 1999

[54] ALTERNATE ROUTING FOR CALLS REQUIRING MONITORING

[75] Inventors: Michael Coyne, Stockholm, Sweden; Ari Peltonen, Aachen, Germany; Erkki Joensuu, Siuntio, Finland; Eric L. Valentine, Plano, Tex.

[73] Assignee: Ericsson Inc., Research Triangle Park, N.C.

[21] Appl. No.: 08/802,671

[22] Filed: Feb. 19, 1997

[51] Int. Cl.⁶ .................................................. H04M 3/22
[52] U.S. Cl. .............................. 379/221; 379/34; 379/211
[58] Field of Search ................................. 379/207, 211, 379/212, 219, 220, 229, 221, 230, 34, 35, 258, 273

[56] References Cited

U.S. PATENT DOCUMENTS

| | | | |
|---|---|---|---|
| 5,271,058 | 12/1993 | Andrews et al. | 379/210 |
| 5,274,700 | 12/1993 | Gechter et al. | 379/210 |
| 5,329,578 | 7/1994 | Brennan et al. | 379/211 |
| 5,390,169 | 2/1995 | Bernstein | 370/55 |
| 5,392,277 | 2/1995 | Bernstein | 370/55 |
| 5,428,667 | 6/1995 | Easterling et al. | 379/59 |
| 5,442,691 | 8/1995 | Price et al. | 379/220 |
| 5,452,350 | 9/1995 | Reynolds et al. | 379/220 |
| 5,471,519 | 11/1995 | Howe et al. | 379/67 |
| 5,550,904 | 8/1996 | Andruska et al. | 379/221 |
| 5,590,171 | 12/1996 | Howe et al. | 379/33 |
| 5,661,792 | 8/1997 | Akinpelu et al. | 379/220 |
| 5,689,555 | 11/1997 | Sonnenberg | 379/220 |
| 5,740,239 | 4/1998 | Bhagat et al. | 379/220 |
| 5,748,724 | 5/1998 | Sonnenberg | 379/220 |

FOREIGN PATENT DOCUMENTS 0520 688 A2   12/1992   European Pat. Off. .

OTHER PUBLICATIONS

Yen S—L et al, *Intelligent MTS Monitoring System*, Proceedings of the Annual International Carnahan Conference on Security Technology, Albuquerque N.M., Oct. 12–14, 1994.

*Primary Examiner*—Scott Wolinsky
*Attorney, Agent, or Firm*—Jenkens & Gilchrist

[57] ABSTRACT

A communication network and associated method, which includes a plurality of switches, routes a call from a receiving switch to a destination switch either directly or through an alternate switch. Either the receiving switch or the destination switch, or both, analyze the contents of a store to determine whether the calling party or the called party is marked for alternate routing. The call may be routed to the alternate switch either from the receiving switch or the destination switch if the call is marked for alternate routing.

30 Claims, 5 Drawing Sheets

FIG. 3

| NUMBER | FEATURE 1 | FEATURE 2 | A.R. |
|---|---|---|---|
| XXX-YYY-ZZZZ | X | | X |
| | | | |
| | | | |
| | | | |
| | | | |
| | | | |
| | | | |

FIG. 4

| A.R. NOS. |
|---|
| XXX-YYY-ZZZZ |
| |
| |
| |
| |
| |
| |

FIG. 5

| NUMBER | MSC/VLR CELL | A.R. |
|---|---|---|
| | | |
| | | |
| | | |
| | | |
| | | |
| | | |

ALTERNATE ROUTING FOR CALLS REQUIRING MONITORING

BACKGROUND OF THE INVENTION

1. Technical Field of the Invention

The invention is related to the field of telephone systems, and more particularly, the switching systems within the public land mobile networks (PLMN) and the land based wireline telephone networks.

2. Description of the Related Art

Current telephone systems including cellular telephone systems are increasingly becoming a powerful and efficient medium for coordinating and carrying out illegal activities. Accordingly, governments have a need to monitor the activities and phone calls of particular suspects. Given some of the recent horrific acts of terrorism, the government's need to monitor certain phone calls is greater than ever. Given today's information technology, as well as the increased mobility of people on a worldwide basis, however, monitoring the activities and conversations of certain individuals has become increasingly problematic. One day, a suspect might be in Europe. On another day, the same suspect might be either in the United States or in a third world nation. Because special equipment is required to monitor telephone conversations, it is difficult to monitor many telephone conversations given the ease with which anyone, including a suspect, can travel around the world.

There are several obstacles to monitoring calls of an individual traveling around the world. First, monitoring equipment would have to be installed worldwide. Clearly, the expense of this solution is very high. Second, there may well be legal obstacles to importing monitoring equipment into some countries and to removing taped conversations.

Moreover, it is difficult to monitor a conversation being carried by a mobile station as it passes geographic areas which are served by different mobile switching centers and base station systems. In such a scenario, one conversation is partially recorded by each of multiple monitoring devices. Combining each recorded part to create one monitored conversation would be difficult and labor intensive.

What is needed therefore is a system and a method for efficiently monitoring specified telephone systems, including cellular systems, regardless of the location of the specified telephonic device, in a way which is efficient and which overcomes potential legal difficulties associated with importing or exporting monitoring equipment. A system is needed which allows monitoring regardless of the phone location.

SUMMARY OF THE INVENTION

A method and an apparatus are provided for routing a call through an alternate destination to allow a call to be monitored efficiently, or for other commercial or regulatory reasons. A local switch for a calling party examines the calling party ID to determine whether the calling party is marked for alternate routing. If not, the local switch examines the called party identity to determine whether alternate routing is required for it. If alternate routing is required for either party, the contents of defined calling information signals are modified to cause the switches of the communication network to re-route the call. More specifically, the call is routed to an alternate destination by replacing the called party number of the calling information signals with the number of the alternate destination. The call is then routed to the alternate destination. Along with the routing of the call, calling information signals are sent to the alternate location which include the modified contents. The modified contents of the calling information signals include the number of the alternate location of the calling party information and the original called party information.

The receiving switch subsequently restores the call information signals to their original values by extracting and placing the original called party number within the called party number field. At this point, the call is routed to the original destination and the original (restored) calling information signals are transmitted therewith. Monitoring equipment may be connected to the call at the alternate site through which the call has been routed. Accordingly, the site may be used to monitor calls from multiple switches thereby avoiding a need to duplicate equipment in each local switch.

The invention may be implemented in one of several communication networks. By way of example, this system can be implemented in a public land mobile network (PLMN), in a land-based wireline network, or even in a network which includes satellite-based transceivers and user terminals. The system may also be implemented in a network which includes combinations of the aforementioned networks.

BRIEF DESCRIPTION OF THE DRAWINGS

A more complete understanding of the method and apparatus of the present invention may be obtained by reference to the following Detailed Description when taken in conjunction with the accompanying Drawings wherein:

FIG. 3 is a table illustrating a data arrangement within a local switch according to a first embodiment of the present invention;

FIG. 4 is a table illustrating a data arrangement within a local switch according to a second embodiment of the present invention;

FIG. 5 a table illustrating a data arrangement within a local switch according to a third embodiment of the present invention;

DETAILED DESCRIPTION OF THE DRAWINGS

Figure 1:
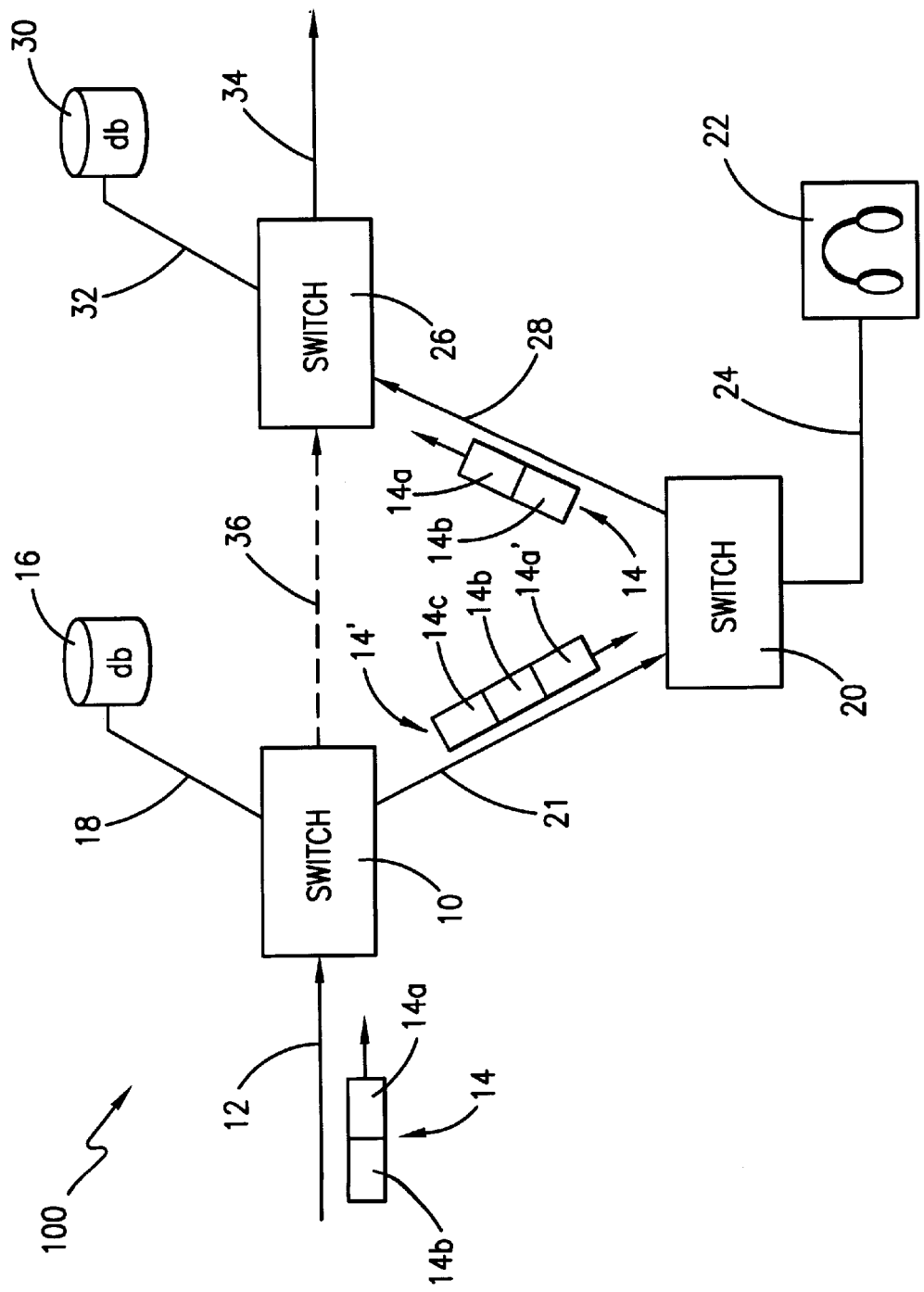
FIG. 1 is a block diagram illustrating a first embodiment of the present invention.

FIG. 1 is a block diagram illustrating a first embodiment of the present invention. Referring now to FIG. 1, a communication network 100 includes a plurality of communication switches for routing a call from one point to another. Switch 10 may be any one of many commonly known telecommunication switches including a Mobile Switching Center (MSC), a Switching Service Point (SSP), and a local switch. These listed switches are the types of switches found in PLMN, Advanced Intelligent Network (AIN), and conventional wireline telephony networks, respectively. Generally, switch 10 is for receiving a call and for routing that call in a specified manner according to information received for an incoming call, which information includes parameters, such called party number and calling party number, which relate to the calling party and to the called party. As may be seen, switch 10 is connected to line 12 for receiving calls and calling information 14 therefrom. The calls received on line 12 may originate from another communication system, network or switch. For those calls which originate from a telephone that is connected to line 12, switch 10 must generate the calling information signals including the called party number and the calling party number to be routed with the incoming call in a manner as is known to those skilled in the art.

Switch 10 is also connected to database 16 by line 18. Database 16 is for storing subscriber features of both the calling party and the called party. Database 16 may be found in multiple forms, depending upon the network within which it exists. Within the PLMN, database 16 is commonly referred to as a home location register (HLR). Similarly, in an AIN, database 16 is formed within the service control point (SCP), which typically also includes service control logic. In a local switch in a conventional wireline network, database 16 is merely formed of a memory device or element within the local switch.

Switch 10 is also connected to switch 20 by line 21. Switch 20, similar to switch 10, is for receiving a call and calling information and for routing the incoming call to a destination. Switch 20 also, however, is for connecting monitor 22 over line 24 to monitor a specified call being routed through switch 20. In general, monitor 22 is for monitoring call information about a specific call being routed through switch 20. Monitor 22 may also be used for actually recording the contents of the specified call being routed through switch 20.

Continuing to refer to the system of FIG. 1, switch 20 is also connected to switch 26, by line 28. Switch 26, also like switches 10 and 20, is for receiving a call and calling information and for routing the call. Switch 26 is also connected to database 30 over line 32. Database 30 is for maintaining subscriber information about called parties and calling parties and is similar to database 16. It is to be understood, however, that database 30 is not required to be identical to database 16. In other words, in one embodiment, database 16 might be formed of an HLR in a PLMN while database 30 is formed within an SCP in an AIN. As may be seen, switch 26 is also connected to line 34. Line 34 forms the output of system 100 of FIG. 1. By way of example, line 34 may be coupled to the terminating destination of a call, by way of example, a cellular phone (through a base station).

Operation of the inventive system of the present invention may best be understood by several examples. In a first example, calling information 14 is received on line 12 specifying that a call is to be routed through switch 10 to switch 26 over line 36. More specifically, calling information 14 includes a first portion 14a and a second portion 14b, wherein the first portion includes a called party number and the second portion includes a calling party number. It is from the called party number that switch 10 determines that the call is to be routed to switch 26. In this example, switch 26 is the local switch for the number of the called party.

Switch 10, upon receiving calling information 14, analyzes the contents of database 16 to determine if first portion 14a includes a number for which alternate routing is required. More specifically, switch 10 examines the subscriber feature portion of database 16 to determine whether the contents of portion 14 indicate that the calling party is one for which alternate routing should be performed. Additionally, switch 10 determines from database 16 the destination switch for the call. For the present example, the destination switch is switch 26. Accordingly, if switch 16 determines from examination of the contents of database 16 that the incoming call is not one for which alternate routing should be performed, switch 10 routes the call to switch 26 over line 36. If the contents of first portion 14a of calling information signal 14 indicates that the call is subject to alternate routing, as determined by examining the contents of database 16, then switch 10 alternately routes the call to switch 20 over line 21. For this example, only the contents of first portion 14a are compared to contents within database 16 to determine if alternate routing is required. It is understood, of course, that the same applies or can apply to second portion 14b.

As a part of alternately routing the call, the contents of first portion 14a are replaced with a specified number which causes switch 10 to route the call to switch 20 and which prompts switch 20 to connect monitor 22 to the incoming call so that the call may be monitored. At approximately the same time, the original contents of first portion 14a are placed in a third portion 14c of calling information signal 14. As may be seen, therefore, calling information signal 14' now includes an extra portion of information. More specifically, calling information 14' now includes an original called party number, a calling party number and a new called party number. It is understood, of course, that a third portion of information means that information is stored in a third field. In one embodiment, the third field is always transmitted. At issue is whether it is used to convey information. In anther embodiment, the third field is only transmitted when it contains valid information.

Upon receiving calling information 14', switch 20 operates to connect monitor 22 over line 24 to the incoming call which relates to calling information signal 14'. In the embodiment of system 100, it is the specified number within first portion 14a', namely, the new called party number, that acts to prompt switch 20 to connect monitor 22 to the incoming call. Approximately at the same time that switch 20 connects monitor 22 to the incoming call on line 21, switch 20 also acts to route the call to switch 26 through line 28. More specifically, switch 20 removes the contents from third portion 14c, namely the original called number field, and reinserts the information into first portion 14a. Calling information signal 14 is then transmitted to switch 26 comprising the same first and second portions 14a and 14b which were received by switch 10 on line 12. It is from the new information in first portion 14a that switch 20 knows to route the call to switch 26, the destination switch, over line 28.

Switch 26, in turn, receives the incoming call on line 28 and routes the call to its destination on line 34. Although not explicitly shown, in this example, the destination for the call on line 34 is a home telephone serviced by local switch 26.

Figure 2:
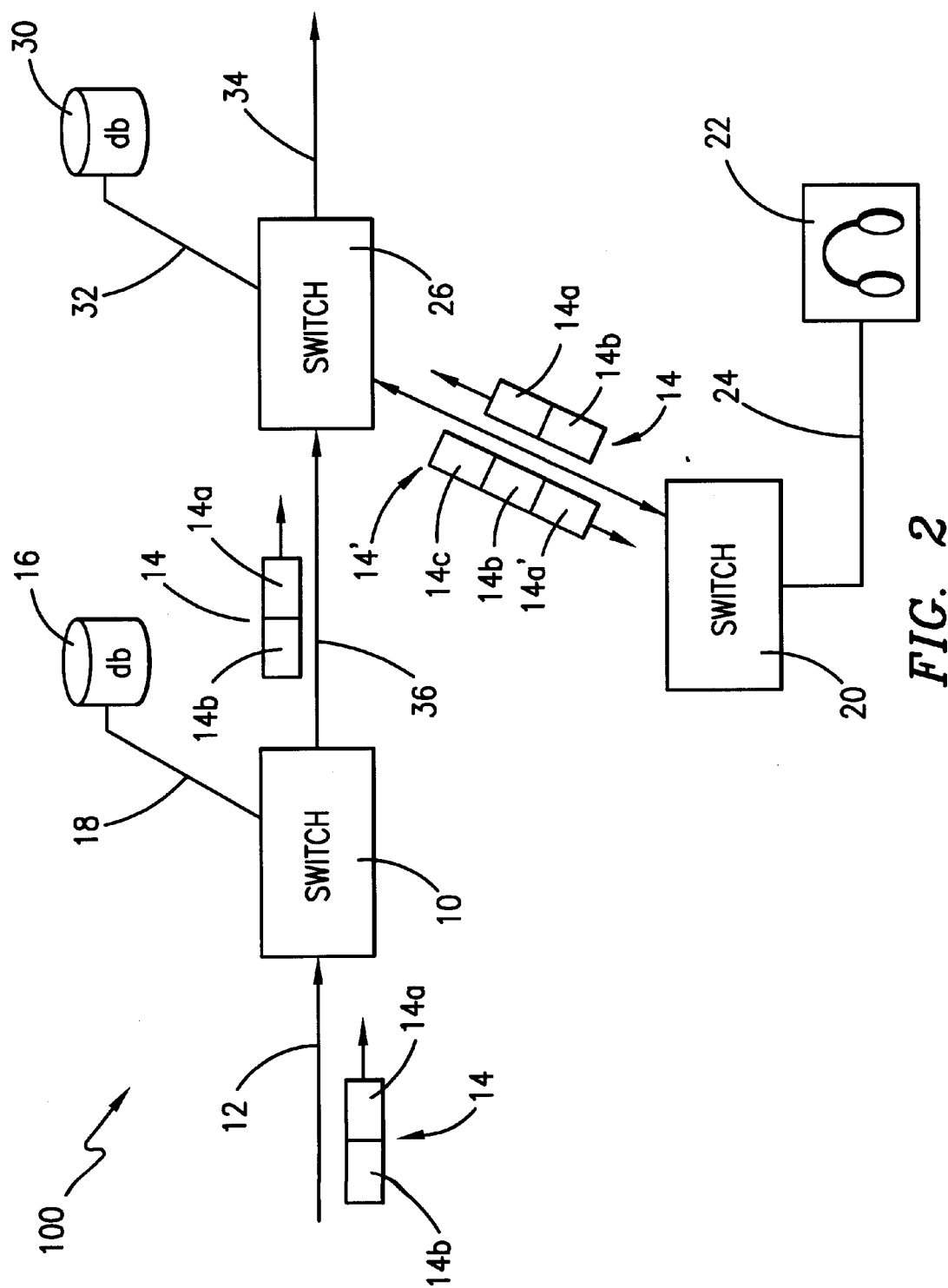
FIG. 2 is a block diagram illustrating a second embodiment of the present invention.

FIG. 2 is a block diagram illustrating a second embodiment of the present invention. Referring now to FIG. 2, a second example of the operation of a communication network which includes the invention is shown. As may be seen, switch 10 routes the call to switch 26 instead of switch 20. Accordingly, switch 26 routes the call to switch 20 which in turn routes the call back to switch 26. For the example of the operation of the system 100 of FIG. 2, switch 10 routes the call to switch 26 because the contents of database 16 did not indicate that the incoming call relating to calling information 14 was subject to alternate routing. In the embodiment of FIG. 2, it is database 30 that includes information which specifies that calls for the called party are to be alternately routed. More specifically, the information stored within database 16 did not indicate that the call was subject to alternate routing because neither the contents of first portion 14a nor second portion 14b were marked within database 16 for alternate routing. Accordingly, switch 10 routes the call to switch 26 over line 36. As a part of routing the call to switch 26, switch 10 transmits calling information 14 with the same first and second portions 14a and 14b as it received on line 12.

Switch 26, in this example, determines that the call is marked for alternate routing and routes the call to switch 20. More specifically, upon receiving calling information 14 on line 36, switch 26 examines the contents of database 30 connected to switch 26 by line 32, to determine that either the contents of first portion 14a or second portion 14b indicate that the call is marked for alternate routing. For example, switch 26 may determine that all calls received for the calling party, whose number was received in second portion 14b, are to be monitored. Switch 26 makes this determination by comparing the called party information which relates to the contents of second portion 14b, namely, the called party number to data stored within database 30.

Because, for this example, the call is to be monitored, switch 26 routes the call to switch 20 and transmits calling information 14' thereto. As before, calling information 14' includes first portion 14a', second portion 14b, and third portion 14c. As before, the original contents of first portion 14a are stored into third portion 14c and a new specified number is inserted in first portion 14a'. The new number inserted in first portion 14a' causes switch 26 to route the call to switch 20. Switch 20, based upon the specified number within first portion 14a', connects monitor 22 to the call as the call is routed back to switch 26. As switch 20 routes the call back to 26, calling information 14 is reconstructed wherein the contents of third portion 14c are placed back into first portion 14a. After receiving the call from switch 20, switch 26 routes the call to line 34 to its destination.

FIG. 3 is a table which illustrates a subscriber feature store which includes a field for designating whether a subscriber is marked for alternate routing. Referring now to FIG. 3, table 300 includes a plurality of rows 310. Each row 310 includes a number to identify the subscriber, for example, the subscriber phone number. Each row 310 also includes a plurality of fields used to identify the subscriber features associated with a particular subscriber. As may be seen, the subscriber table 300 also includes a field to indicate whether a specified number is marked for alternate routing. It is to be understood, of course, that table 300 of FIG. 3 is merely illustrative of the types of subscriber feature tables that may be implemented and that many changes to the arrangement of subscriber feature information may be made without departing from the scope of the invention.

In general, table 300 is used to define whether a calling party is subject to alternate routing. If the table 300 indicates that the calling party is subject to alternate routing, then a local switch for the subscriber will reroute the call to the alternate destination in a manner as disclosed in this application whenever the calling party places a call.

FIG. 4 is a table illustrating a data arrangement within a local switch according to a second embodiment of the present invention. Referring now to FIG. 4, table 400 illustrates a simple table which reflects that a store merely maintains a list of those subscribers which are marked for alternate routing. In general, table 400 includes a list of subscribers being served by the local switch whose calls are marked for alternate routing.

In the case of a wireline telephone network, it is believed that a list as shown in FIG. 4 is adequate. However, if the invention is implemented in a PLMN, then a table which includes multiple columns might be used instead. For instance, as a part of an MSC/VLR, a table might include, at a minimum, an ID number of the mobile station and a column reflecting whether that mobile station is subject to alternate routing. It goes without saying that such a table may include other columns for other necessary types of information maintained by an MSC/VLR. By way of example, table 500 of FIG. 5 illustrates a table which could be maintained in an MSC/VLR.

FIG. 5 is a table illustrating a data arrangement within a local switch according to a third embodiment of the present invention. Referring now to FIG. 5, table 500 includes a plurality of columns. The first column is for specifying the mobile station number. The second column is for specifying the last known cell within which the mobile station's presence was registered. The third column specifies whether the particular mobile station is marked for alternate routing.

Figure 6:
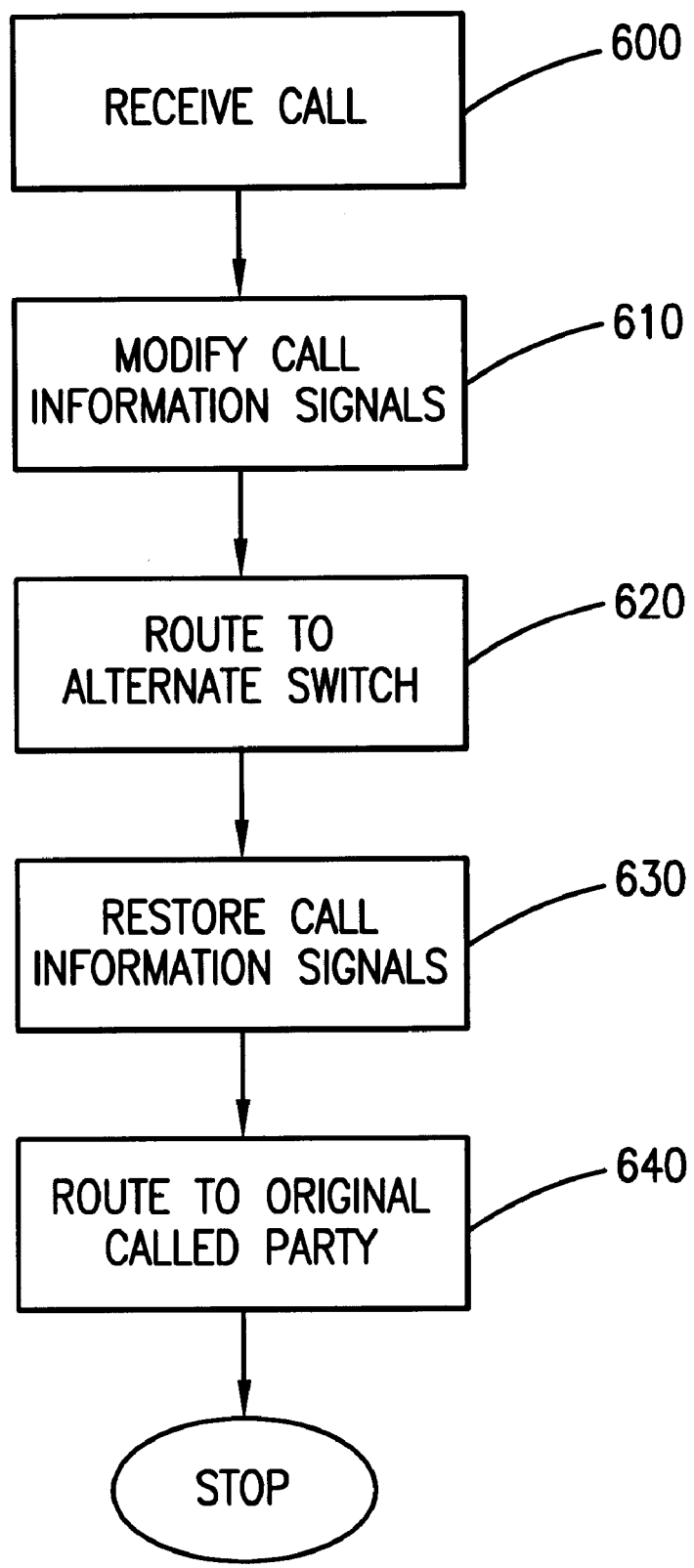
FIG. 6 is a flow chart illustrating a first embodiment of the inventive method.

FIG. 6 is a flow chart illustrating a first embodiment of the inventive method. FIG. 6 is a flow chart illustrating a method of alternate routing. Referring now to FIG. 6, a switch receives a call (step 600) and then modifies the call information signals to specify an alternate number or switch to which the call is to be routed 610. Specifically, the original called party information is stored in a different field and the number of the alternate switch is placed within the called party signal field. For example, the original called party number may be stored in a field by the same name, namely, Original Called Party Number. Thereafter, the call is routed to the alternate switch (step 620). As a part of routing the call to the alternate switch in step 620, the modified called party information, which includes the original called party number, is transmitted to the alternate switch along with the routing of the call.

Thereafter, within the alternate switch, the original called party number is extracted from the called party information and the original called party information signal is restored (Step 630). In other words, the original called party number is placed back into the called party field. Thereafter, the call is routed to the original called party (step 640). As a part of step 640, the original called party information is also transmitted to the original called party switch. Thereafter, the method is complete and the call is connected to the called party.

Figure 7:
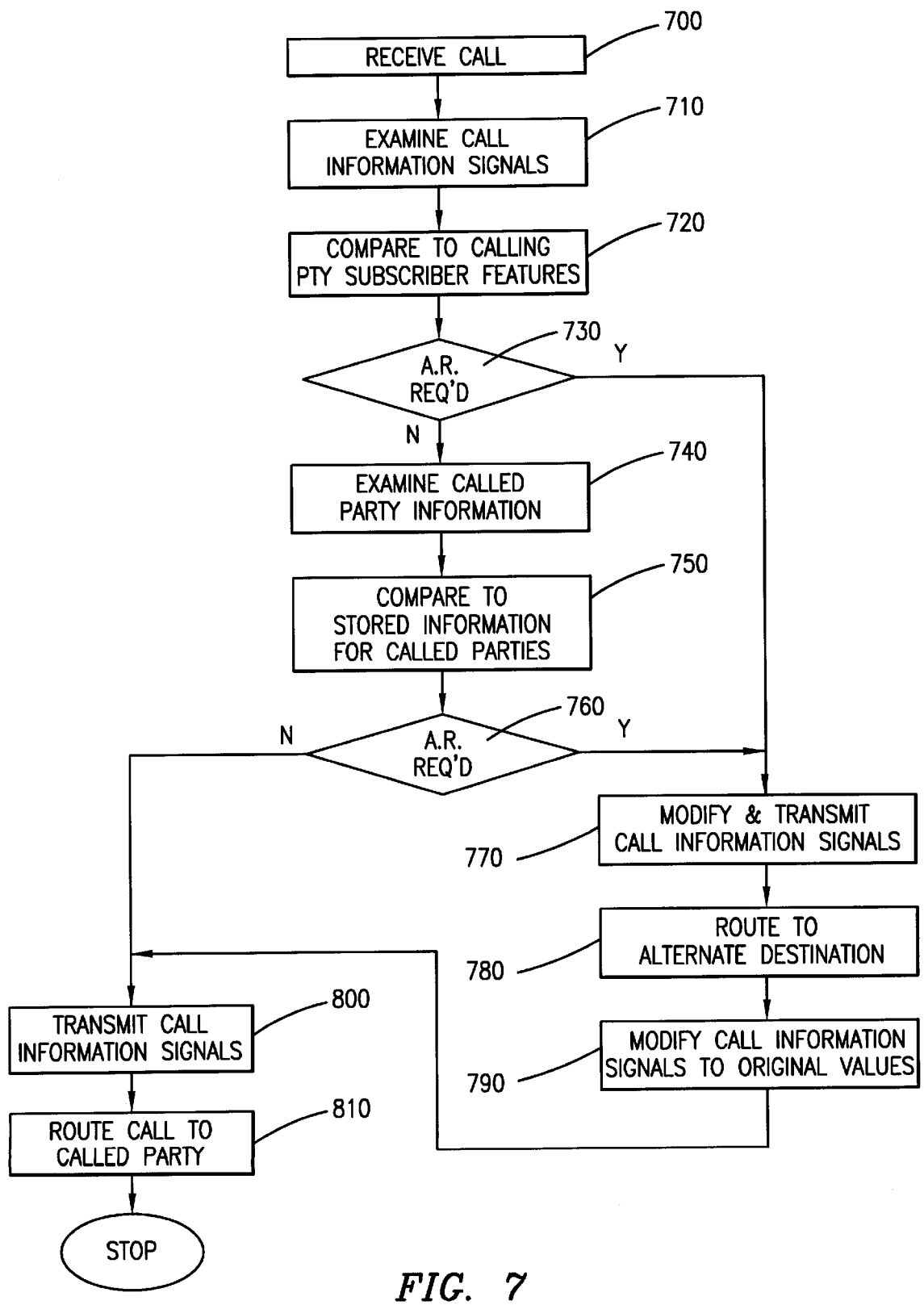
FIG. 7 is a flow chart illustrating a second and preferred embodiment of the inventive method.

FIG. 7 is a flow chart illustrating a second and preferred embodiment of the present inventive method. Referring now to FIG. 7, a switch receives a call (step 700). As a part of receiving the call, the switch also receives call information signals. The switch extracts the call information signals which identify the calling party (step 710). Generally, this step includes extracting an ID number such as the calling party phone number. The ID number of the calling party is then used to determine what subscriber features are associated with the calling party 720. Typically, the switch will communicate with a store or database to examine defined subscriber features within the store or database. To illustrate, switch 10 of FIG. 2 examines the contents of database 16. The calling party phone number is used as an address or pointer within the store or database to determine what subscriber features are presently active for the calling party.

The solution of adding a column to a subscriber feature table is very convenient even though alternate routing is not necessarily a subscriber feature. In an another embodiment, however, database 16 merely maintains a list of those subscribers served by switch 10 which are marked for alternate routing. Here, the mere presence of a calling party ID number within the list indicates that the party is marked for alternate routing.

After examining the subscriber features as specified in the contents of a database or store, the switch then determines if alternate routing is required for the calling party (step 730). If alternate routing is not required for the calling party, the switch analyzes the called party information.

More specifically, the switch first examines the called party information found in the call information signals (step 740). The switch then compares the called party information to the contents of a store or database (step 750) to determine if alternate routing is required for the called party (step 760).

If the switch determines that alternate routing is required either in steps 730 or 760, the switch modifies the call information signals and transmits them to the alternate switch (step 770). More specifically, the called party number is placed into an alternate field within the modified call information signals and a new number is placed within the called party number field. This new number directs the switch to route the call to the alternate switch (step 780) and to transmit the modified call information signals thereto.

Once the alternate switch receives the call and the modified call information signals, the alternate switch recreates the original call information signal by extracting the original called party number from the field within which it was transmitted and places that number back into the called party number field (step 790).

At this point in the inventive method, the alternate switch routes the call and the call information signals to the original destination. More specifically, if the original switch determines that alternate routing is not required either for the calling party or called party, the original switch routes transmits the original call information signals to the original destination switch (step 800) and the call to the original destination switch (step 810). Alternatively, if the call has been routed to an alternate switch, the alternate switch transmits the call information signals to the original destination switch as specified by the called party number (step 800). The call is also routed to the original destination switch (step 810) from the alternate switch where it can be connected to the called party phone or device.

The method illustrated in the flow diagram of FIG. 7 generally includes determining whether alternate routing is required for the called party or the calling party. This determination may be made either in the original switch which received the call from the calling party or in the destination switch which serves the called party and which connects the call to the called party. For example, it is the destination switch, namely switch 26 of FIG. 2, which examines the called party information to determine if the called party is marked for alternate routing.

Regardless of whether it is switch 10 or switch 26 that performs the determination of whether the called party is subject to alternate routing, the inventive method requires that a switch examine the called party information to extract a calling party or a called party ID number. In the case of a mobile network, this extracted ID number may actually be a number other than a phone number. The extracted ID number, in either case, is used to identify the calling party or the called party. This ID number is then compared to information stored within a database store to determine if the call is to be alternately routed.

Although an embodiment of the method and apparatus of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. A communication system having a plurality of switches and multiple route paths for a call being routed therethrough, comprising:

a store for maintaining a list of subscribers marked for alternate routing;

a receiving switch connected to said store, said receiving switch being operable to route a call by way of a first route path if the call is associated with a subscriber within said list of subscribers in said store and by way of a second route path if said subscriber is not included within said list of subscribers;

modification means for modifying a routing identification signal associated with said call to route said call on said first route path if said subscriber is within said list and on said second route path if said subscriber is not included within said list; and a destination switch coupled to said first and second route paths, the destination switch for connecting the call to a termination device.

2. The communication system of claim 1 further comprising an alternate switch forming a part of the second route path.

3. The communication system of claim 2 wherein said modification means comprises, within said receiving switch, a first signaling means for transmitting a two component signal to the destination switch and for transmitting a three component signal to the alternate switch.

4. The communication system of claim 3 wherein said modification means comprises, within said alternate switch, a second signaling means for receiving the three component signal and for transmitting a two component signal to the destination switch.

5. The communication system of claim 1, further comprising:

monitoring means, attached to an alternate switch along said first route path, for monitoring said call.

6. The communication system of claim 5, wherein said monitoring means monitors a plurality of said calls.

7. A method, within a communication network, for routing an incoming call to an original destination, said method comprising the steps of:

examining a first call information signal for the incoming call, said first call information signal comprising a called party number field and a calling party number field, said called party number field including an original called party number and the calling party number field including a calling party number;

examining the contents of a store to determine whether alternate routing is required for the incoming call;

modifying said first call information signal to include a new called party number in the called party number field, a calling party number within the calling party number field and the original called party number within an original called party number field, said first call information signal after said step of modifying being a second call information signal;

transmitting said second call information signal to an alternate destination;

routing the call to the alternate destination;

at the alternate destination, modifying the second call information signal to recreate said first call information signal;

transmitting said first call information signal to the original destination; and routing the call to the original destination.

8. The method according to claim 7, further comprising, after routing said call to said alternate destination, the step of:

monitoring said incoming call at said alternate destination.

9. The method according to claim 8, wherein said step of monitoring monitors a plurality of said incoming calls.

10. A method for routing an incoming call within a communication network to an original destination based upon records included in an alternate routing database, the incoming call including a called-party field and a calling-party field, the method comprising the steps of:

determining whether at least one of the called-party field and the calling-party field matches a particular one of said records within said alternate routing database;

responsive to the determination that at least one of the called-party field and the calling-party field matches said particular one of said records in the alternate routing database, modifying said incoming call to include an alternate switch field and, routing the call to an alternate destination; and responsive to the determination that neither the called-party nor the calling-party fields match said particular one of said records in said alternate routing database, routing the call to the original destination.

11. The method of claim 10 wherein the step of determining includes the step of extracting at least one of an identification (ID) number of the calling-party and an ID number of the called-party.

12. The method of claim 11 wherein the step of extracting said ID number includes the step of extracting a respective one of a phone number of said calling-party and a phone number of said called-party.

13. The method of claim 10 wherein the step of determining includes the step of determining whether at least one of the calling-party field and the called-party field is marked for alternate routing.

14. The method of claim 10 wherein said step of routing said call to said original destination includes the step of transmitting a two part call information signal to the original destination responsive to the determination that neither of the called-party field and the calling-party field matches a particular record included in the alternate routing database.

15. The method of claim 10 wherein said step of routing said call to said alternate destination includes the step of transmitting a three part call information signal to the alternate destination responsive to the determination that at least one of the called-party field and the calling-party field matches a particular record included in the alternate routing database.

16. The method of claim 10 wherein said step of routing said call to said original destination includes the step of transmitting a two part call information signal to the original destination from the alternate destination responsive to the determination that at least one of the called-party field and the calling-party field matches a particular record included in the alternate routing database.

17. A communication system for routing an incoming call therethrough, said communication system comprising:

a receiving switch for receiving a first call information signal corresponding to said incoming call, said first call information signal having a called-party field and a calling-party field therein;

a destination switch, associated with said called-party field, for receiving said first call information signal of said incoming call and for routing said incoming call to a destination device corresponding to said called-party field;

an alternate switch, in communication with said receiving and destination switches; and routing means for routing said incoming call through said alternate switch to said destination switch, said first call information signal of said incoming call being modified to a second call information signal for receipt by said alternate switch, said second call information signal of said incoming call received by said alternate switch being modified back to said first call information signal for receipt by said destination switch.

18. A communication system according to claim 17, further comprising:

a database attached to said receiving switch, said database containing a plurality of identifiers therein, said routing means routing said incoming call from said receiving switch to said alternate switch if said first call information signal contains one of said identifiers therein.

19. The communication system according to claim 18, wherein said database is within a device selected from the group consisting of a home location register, a service control point and a memory device.

20. The communication system according to claim 17, further comprising:

a database attached to said destination switch, said database containing a plurality of identifiers therein, said routing means routing said incoming call from said destination switch to said alternate switch of said first call information signal contains one of said identifiers therein.

21. The communication system according to claim 20, wherein said database is within a device selected from the group consisting of a home location register, a service control point and a memory device.

22. The communication system according to claim 17, further comprising, within said receiving switch, a first signal modification means for modifying said first call information signal by adding an alternate switch field thereto.

23. The communication system according to claim 22, wherein said first signal modification means modifies the ordering of said called-party, calling-party and alternate switch fields within said second call information signal for said routing means to route said second call information signal of said incoming call to said alternate switch.

24. The communication system according to claim 22, further comprising, within said alternate switch, a second signal modification means for removing said alternate switch field.

25. The communication system according to claim 24, wherein said second signal modification means modifies the ordering of said called-party and calling-party fields pursuant to said first call information signal.

26. The communication system according to claim 17, wherein at least one of said receiving, destination and alternate switches is selected from the group consisting of a mobile switching center, a switching service point and a local switch.

27. The communication system according to claim 17, wherein at least one of said receiving, destination and alternate switches is within a telecommunications system selected from the group consisting of a public land mobile network, advanced intelligent network and wireline telephony networks.

28. The communication system according to claim 17, wherein said routing means routes said incoming call directly from said receiving switch to said destination switch if said first call information signal fails to contain a monitoring identifier therein.

29. The communication system according to claim 17, further comprising:

monitoring means, attached to said alternate switch, for monitoring said incoming call.

30. The communication system according to claim 29, wherein said monitoring means monitors a plurality of said incoming calls.

* * * * *